United States Patent [19]

DeMarti, Jr. et al.

[11] Patent Number: 5,041,933

[45] Date of Patent: Aug. 20, 1991

[54] MAGNETIC HEAD SUSPENSION APPARATUS FOR USE WITH A PHOTOGRAPHIC FILM

[75] Inventors: Jack C. DeMarti, Jr., Rochester; John G. Weigand, Churchville, both of N.Y.

[73] Assignee: Eastman Kodak Company, Rochester, N.Y.

[21] Appl. No.: 391,205

[22] Filed: Aug. 9, 1989

[51] Int. Cl.⁵ .................. G11B 5/48; G11B 5/633; G03B 31/00; G03B 21/50
[52] U.S. Cl. ........................... 360/104; 360/3; 352/92
[58] Field of Search ............... 352/92, 236, 37; 354/21, 105, 106; 355/40; 360/104, 3

[56] References Cited

U.S. PATENT DOCUMENTS

| | | | |
|---|---|---|---|
| 2,618,710 | 11/1952 | Camras | 360/104 |
| 2,678,357 | 5/1954 | Schuessler | 360/104 |
| 3,031,531 | 4/1962 | Thevenaz | 360/104 |
| 3,352,975 | 11/1967 | Floden | 360/104 |
| 3,452,161 | 6/1969 | Hafler | 352/37 |
| 3,981,570 | 9/1976 | Ashida et al. | 352/37 |
| 4,208,108 | 6/1980 | Amikura et al. | 360/3 |
| 4,270,853 | 6/1981 | Hatada et al. | 354/76 |
| 4,270,854 | 6/1981 | Stemme et al. | 354/76 |
| 4,500,183 | 2/1985 | Tanikawa | 354/21 |
| 4,613,911 | 9/1986 | Ohta | 360/3 |
| 4,689,696 | 8/1987 | Plummer | 358/333 |
| 4,736,215 | 4/1988 | Hudspeth et al. | 354/21 |
| 4,860,037 | 8/1989 | Harvey | 354/105 |

Primary Examiner—A. J. Heinz
Assistant Examiner—Jefferson Evans
Attorney, Agent, or Firm—Marianne J. Twait

[57] ABSTRACT

A magnetic head suspension system for use in a photofinishing operation comprises a fixed support and a pair of magentic head suspension assemblies each rotatably mounted on the support. The magnetic head suspension assemblies are biased towards each other to engage opposite edges of the film respectively. Each magnetic head suspension assembly is rotatable relative to the fixed support to compensate for film width variations and film edge irregularities to insure constant orientation of the magnetic heads with respect to the film edges.

7 Claims, 2 Drawing Sheets

MAGNETIC HEAD SUSPENSION APPARATUS FOR USE WITH A PHOTOGRAPHIC FILM

CROSS REFERENCE TO RELATED APPLICATIONS

1. U.S. Ser. No. 522,395, entitled CAMERA APPARATUS FOR MAGNETICALLY RECORDING ON FILM, and filed Apr. 30, 1990 in the name of Douglas H. Pearson, which is a continuation of U.S. Ser. No. 427,210 filed Oct. 24, 1989 now abandoned, which is a continuation of U.S. Ser. No. 282,419 filed Dec. 9, 1988, now abandoned.

2. U.S. Serial No. 391,746, entitled MAGNETIC HEAD SUSPENSION APPARATUS, and filed Aug. 9, 1989 in the names of Jack C. DeMarti, Jr. and John G. Weigand.

BACKGROUND OF THE INVENTION

1. Field of The Invention

This invention relates to magnetic recording apparatus and more specifically to a magnetic head suspension and follower assembly for use in reading information from and recording information on photographic film during photofinishing operations.

2. Description of The Prior Art

In copending application Ser. No. 282,419 cross referenced above, there is disclosed apparatus for supporting magnetic heads in a photographic still camera for recording information useful to the customer and/or the photofinisher on a magnetic surface of a photographic film. Also, the magnetic surface may contain information recorded during film manufacture relating to film speed, emulsion type, etc.

The apparatus disclosed in application Ser. No. 282,419 includes a magnetic head mounted on a movable carriage which is biased to engage the edge of the film so that the head records information on a track having a constant orientation with respect to the film edge. In a photofinishing operation where it is desirable to read information from the tracks recorded in the camera to utilize such information during photofinishing, a head similarly oriented with respect to the film edge is necessary to accurately read the recorded information. Also, it is desirable for the photofinisher to have the capability to record additional information relating to finishing such as printing exposure conditions, customer information, reorder information, etc.

SUMMARY OF THE INVENTION

In accordance with the invention, a head suspension system for use in a photofinishing operation comprises a fixed support and a pair of magnetic head suspension assemblies, each of which is rotatably mounted on the support. Surfaces of the suspension assemblies engage opposite edges of the film respectively. Each head suspension assembly is rotatable relative to the support to compensate for film width variations and film edge irregularities to insure constant orientation of the magnetic heads with respect to the film edges. One head assembly is rotatable about a fixed axis and provides a lateral film constraint. The other head assembly is movable relative to the film centerline. A biasing means urges the second movable assembly toward the first to maintain engagement of the assemblies with opposite edges of the film. With this arrangement, each head suspension assembly is capable of accurately reading information from and/or recording information on one or more tracks along each of the film edges.

While each suspension assembly can be arranged to read and/or write, it is preferred that one assembly be dedicated to reading information recorded in the camera and/or during manufacture and the other head assembly be dedicated to recording and reading information relating to photofinishing.

DESCRIPTION OF THE DRAWINGS

Other objects and advantages will become apparent from the following drawings wherein.

DETAILED DESCRIPTION OF THE INVENTION

Figure 1:
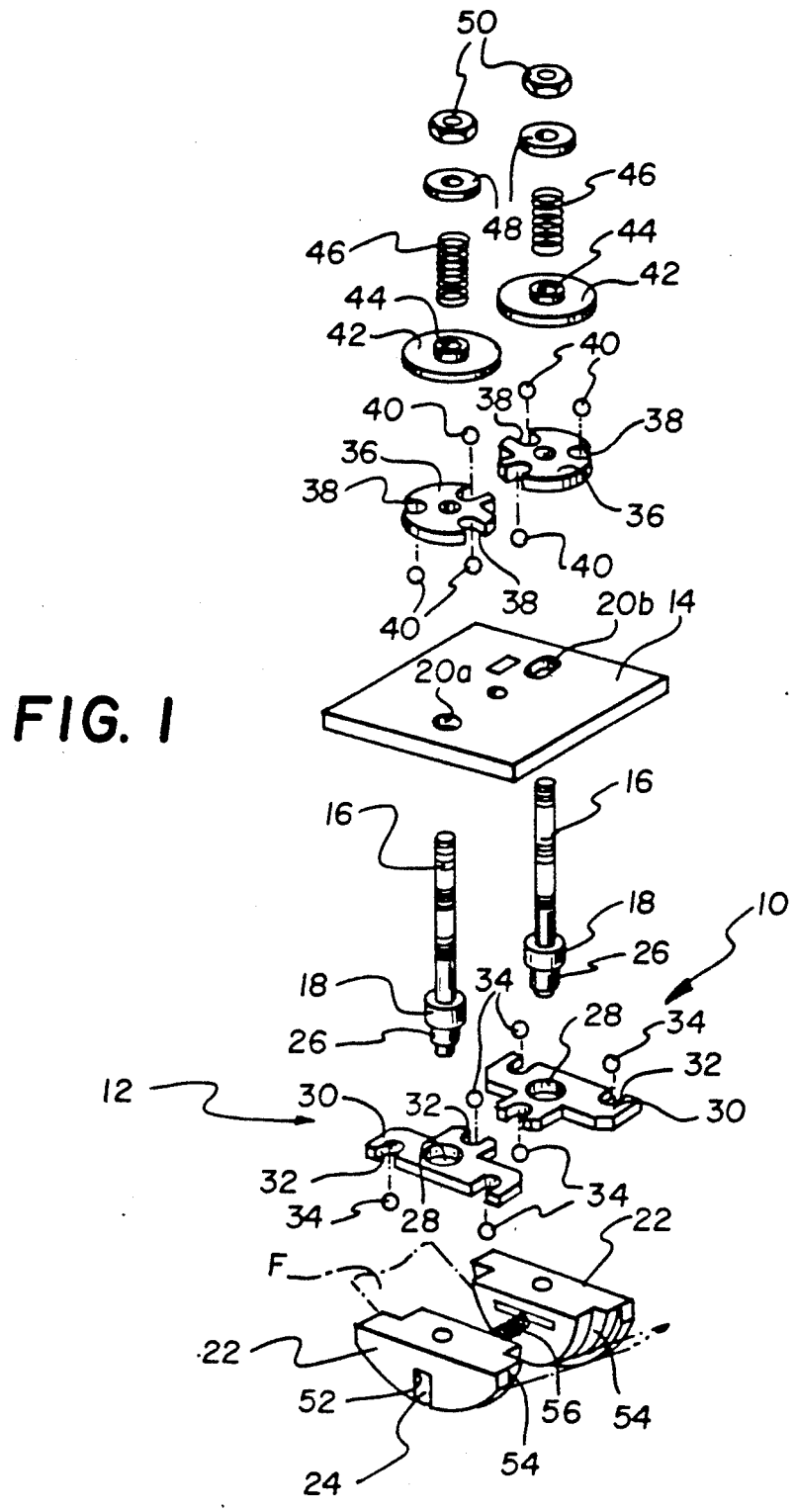
FIG. 1 is an exploded perspective view of a head suspension apparatus in accordance with the present invention.
Figure 2:
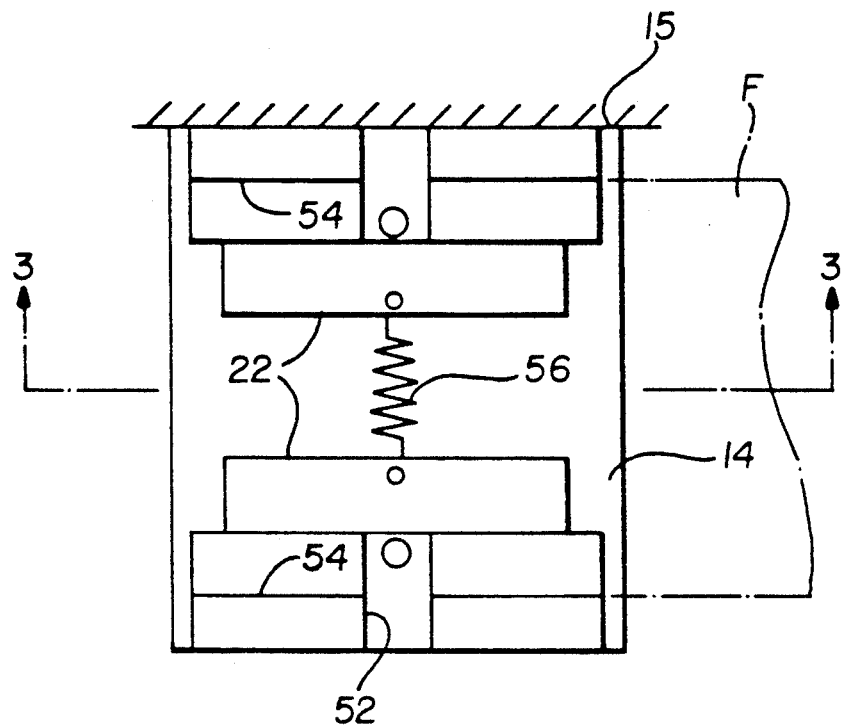
FIG. 2 is a bottom view of the head suspension apparatus shown in FIG. 1 with the heads and film removed.
Figure 3:
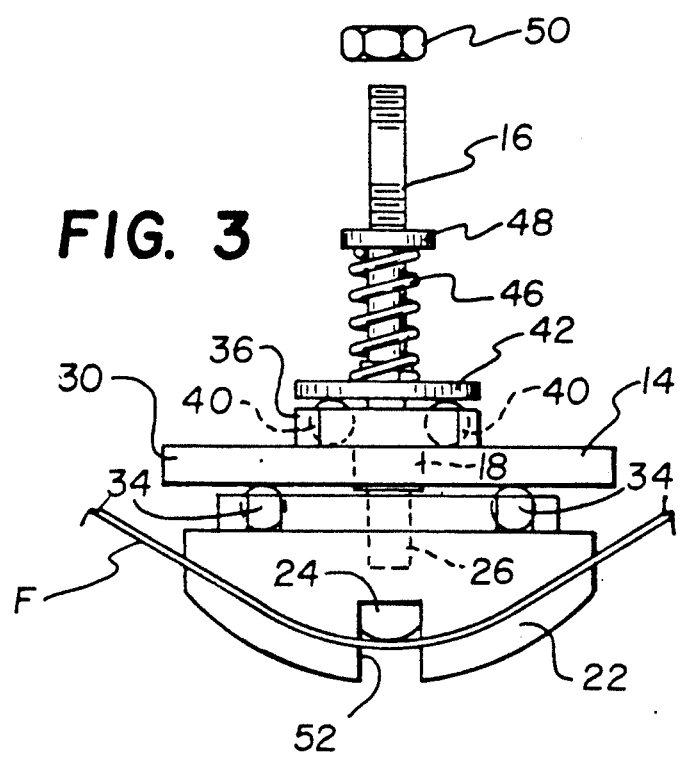
FIG. 3 is a section taken along the line 3—3 of FIG. 2.

Referring to the drawings and most specifically to FIG. 1, a pair of head suspension assemblies identified generally by the reference numerals 10 and 12 are supported on a plate 14 fixed to a suitable supporting structure 15 to read information from and/or record information on the magnetic surface of film F. The two head suspension assemblies 10 and 12 are generally identical and their parts are designated by like reference numerals except where a difference exists. Each assembly comprises an elongated shaft 16 having a bearing 18 journaled into an opening 20 in the plate 14. Each shaft 16 has its lower end attached to a mount 22 for a magnetic head 24. Also, each shaft is provided with a bearing surface 26 journaled in an opening 28 of a ball retainer 30. The retainer 30 is provided with three additional openings 32 for receiving three bearing balls 34 which engage the lower surface of the plate 14 and upper surface of mounts 22 as shown most clearly in FIG. 3.

Each shaft 16 is provided with an upper ball retainer 36 above the plate 30 also provided with three openings 38 for receiving three bearing balls 40 which engage the upper surface of plate 14. A ball retaining washer 42 having a spring centering rim 44 is positioned on each shaft 16 above the retainer 36 Each assembly comprising retainers 30 and 36, balls 34 and 40 and washer 42 is resiliently held together by a spring 46 positioned on each shaft 16 and retained by a washer 48 and a lock nut 50.

With this arrangement, each of the head suspension assemblies 10 and 12 is rotatable relative to the plate 14 by the rolling contact of the balls 34 and 40 with the upper and lower surfaces of the plate 14. Thus each head mount 22 is rotatable about the axis of its respective shaft 16.

Each of the head mounts 22 is provided with a recess 52 for receiving at least one magnetic head 24 and a recess 54 defining a surface adapted to be engaged by the film during its transport over the head mounts. A spring 56 is connected between the head mounts 22 to bias assembly 10 toward assembly 12 as will now be described.

The openings 20 separately identified as 20a and 20b permit relative movement of the two shafts 16 and thus the two head suspension assemblies 10 and 12. More specifically, opening 20a is circular and provides constraint against movement of its associated shaft 16 relative to the centerline of the film. This causes the mount 22 of head suspension assembly 12 to act as a stop which determines the lateral position of the film F. Opening 20b on the other hand is elongated perpendicular to the centerline of the film to permit its shaft 16 and the assembly 10 to move relative to the centerline of the film. With this arrangement, the spring 56 biases the head suspension assembly 10 toward the film centerline to urge the assembly 10 and mount 22 into engagement with the film edge and also to urge the mount 22 of assembly 12 into engagement with the film F.

In operation, each of the head suspension assemblies is free to rotate relative to the plate 30 to compensate for film width variations and film edge irregularities. Spring 58 insures contact of the head mounts with the film edges to maintain orientation of the heads with the film edges and provide for lateral constraint of the film and accurate orientation of the magnetic heads with respect to information tracks along the film edges.

While the invention has been shown and described with reference to a preferred embodiment thereof, it will be apparent that various changes may be made without departing from the scope of the invention as defined by the appended claims.

We claim:

1. Apparatus for reading and/or writing information on a magnetic surface of a photographic film, said apparatus comprising;
   a fixed support;
   a pair of spaced magnetic head suspension assemblies each having a surface for engaging opposite longitudinal edges of a photographic film respectively;
   means for rotatably supporting said magnetic head suspension assemblies on said fixed support; and
   means for supporting one of said magnetic head suspension assemblies for movement relative to another of said magnetic head suspension assemblies.

2. Apparatus as claimed in claim 1 further including means for biasing said one magnetic head suspension assembly toward said other magnetic head suspension assembly to urge said surfaces into engagement with the longitudinal edges of a photographic film.

3. Apparatus as claimed in claim 2 wherein said biasing means comprises a spring extending between said assemblies for urging said assemblies toward each other.

4. Apparatus as claimed in claim 3 wherein said fixed support comprises a fixed plate.

5. Apparatus as claimed in claim 4 wherein each of said magnetic head suspension assemblies comprises;
   an elongated shaft rotatably positioned through an opening in said plate;
   a pair of bearing retainers positioned on said shaft on opposite sides of said plate, each of said retainers having a plurality of openings;
   a plurality of bearing balls positioned in said openings to engage said plate; and
   a magnetic head mount attached to said shaft.

6. Apparatus as claimed in claim 5 wherein said surface for engaging the edge of a photographic film comprises a recess formed in said magnetic head mount.

7. Apparatus as claimed in claim 6 wherein said spring is mounted between said head mounts.

* * * * *